Patented July 13, 1954

2,683,711

UNITED STATES PATENT OFFICE 2,683,711

PENICILLIN-AMINE SALTS

Wallace Frank Short, Charles Isaac Brodrick, and Margaret Lorimer Donaldson, Nottingham, England, assignors to Boots Pure Drug Company Limited, Nottingham, England, a British company No Drawing. Application January 29, 1951,
Serial No. 208,435

Claims priority, application Great Britain
February 7, 1950

5 Claims. (Cl. 260—239.1)

This invention relates to new and improved therapeutic compounds of penicillin and to the manufacture of such compounds.

Penicillin is usually employed for therapeutic purposes either in the form of an alkali metal salt, such as a potassium or sodium salt, or a calcium salt, or in the form of a salt with procaine.

The present invention consists in new salts of penicillin with organic bases possessing antihistamine activity. By penicillin, we mean the acidic substance which consists mainly or wholly of one of the several specific penicillins which are commonly obtained in the production of penicillin, or which consists of a mixture of more than one such specific penicillin. The penicillin is preferably of a purity sufficient to give crystalline sodium or potassium salts and is preferably substantially pure penicillin G. By organic bases possessing antihistamine activity, we mean the well-known class of organic bases which, either alone or in the form of their salts, possess the recognized pharmacological property of acting in the body tissues as histamine antagonists. Members of this class and their salts are particularly well-known under the generic name of antihistamines (See Bovet and Bovet-Nitti, "Medicaments du Système Nerveux Végétatif," S. Karger, Basle 1948, p. 741 et seq.; Jenkins and Hartung, "Chemistry of Organic Medicinal Products," 3rd edit. 1949, J. Wiley & Sons, Inc., p. 333 et seq.)

The present invention also consists in the manufacture of new salts of penicillin with organic bases possessing antihistamine activity by combining an organic base possessing antihistamine activity with penicillin in an inert organic solvent medium, such as ether or chloroform, and subsequently recovering the penicillin salt formed.

Alternatively, the new salts of penicillin may be prepared by a process of metathesis by reacting in a solvent medium, preferably in an aqueous medium, a soluble salt of penicillin with a soluble salt of an organic base possessing antihistamine activity and subsequently recovering the so formed penicillin salt of the organic base.

As organic bases which may be combined with penicillin according to the invention, there may be mentioned specifically 2(N-phenyl-N-benzylaminomethyl) - 4:5 - dihydroglyoxaline, α(N-phenyl - N - benzylamino) acetamidine, 2(N-p-methoxy - benzyl - N - Beta - dimethylaminoethyl) aminopyridine and 2(N-p-methoxybenzyl-N-Beta-dimethylaminoethyl) aminopyrimidine although the invention is not confined to the penicillin salts of these particular organic bases alone and other organic bases which possess antihistamine activity also come into consideration.

The preferred penicillin is penicillin G or penicillin which is substantially pure penicillin G, but other penicillins such as penicillin X and penicillin K may also be used.

The new products of the invention are valuable therapeutic agents. They may be administered orally or formulated into preparations suitable for parenteral administration. They combine the desirable properties of antihistamine activity and the antibiotic effect of penicillin. Furthermore, they have the very useful and unexpected property of producing prolonged penicillin blood levels when administered in a suitable form such as parenteral administration of oily suspensions of the compounds of the invention.

The following examples illustrate the invention.

Example 1

In the preparation of the penicillin G salt of 2(N - phenyl - N - benzylaminomethyl) - 4:5-dihydroglyoxaline, 18.6 g. of potassium penicillin G is dissolved in 100 cc. of cold distilled water and the solution is acidified to pH 2 by the addition of 50% phosphoric acid. The acidified solution is then extracted 5 times with 100 cc. portions of ether, the combined ether extracts are dried over magnesium sulphate for 1 hour while cooling and the dried ether solution is then added slowly, with stirring, to an ice-cold solution of 13.25 g. of 2(N-phenyl-N-benzylaminomethyl)-4:5-dihydroglyoxaline in a dry mixture of 800 cc. of ether and 100 cc. of chloroform. After standing for 30 minutes in the cold the penicillin G salt of 2(N-phenyl-N - benzylaminomethyl) - 4:5-dihydroglyoxaline is filtered off, washed on the filter with a little ice-cold ether and dried in vacuo. Yield 23.8 g. Found: C, 66.0; H, 6.2; N, 11.65, $C_{33}H_{37}O_4N_5S$ requires C, 66.1; H, 6.2; N, 11.7%.

Example 2

In the preparation of the penicillin G salt of α(N-phenyl-N-benzylamino) acetamidine, 3.89 g. of α(N-phenyl-N-benzylamino) acetamidine bitartrate and 1 g. of potassium chloride are heated with 100 cc. of water on the steam bath for 6 hours. The solution is then cooled overnight and the potassium hydrogen tartrate which separates is filtered off. The filtrate, which is a solution of α(N-phenyl-N-benzylamino) acetamidine hydrochloride, is added slowly to a stirred solution of 3.72 g. of potassium penicillin G in 10 cc. of water. The white precipitate of the penicillin G salt of α(N-phenyl-N-benzylamino) acetamidine which is produced is filtered off, washed on the filter with cold water and dried in vacuo. Yield 3.8 g. Found: N, 12.2; $C_{31}H_{35}O_4N_5S$ requires N, 12.2%.

*Example 3*

In the preparation of the penicillin G salt of α(N-phenyl-N-benzylamino) acetamidine, 70 g. of potassium penicillin G are dissolved in 350 cc. of distilled water. The pH of the solution is adjusted to 2.0 by the addition of 50% phosphoric acid solution and the acid solution is extracted with five successive portions of 350 c. c. of ether. The combined ethereal extracts are dried over anhydrous magnesium sulphate; during this operation (the time required for drying is 1 hour) the solution is confined at 0° C. The magnesium sulphate is removed by filtration and the ethereal solution of penicillin G is treated slowly, with stirring, with a solution of 41.9 g. of α(N-phenyl-N-benzylamino) acetamidine in a mixture of 420 cc. of anhydrous chloroform and 420 cc. of anhydrous ether. The solid which seperates is isolated by filtration, washed rapidly with a small portion of anhydrous ether and dried in vacuo over phosphorus pentoxide. There is thus obtained the penicillin G salt of α(N-phenyl-N-benzylamino) acetamidine in the form of a white solid.

*Example 4*

In the preparation of the penicillin G salt of α(N-phenyl-N-benzylamino) acetamidine, a mixture of 31.12 g. of α(N-phenyl-benzylamino) acetamidinium hydrogen tartrate, 13.6 g. of potassium chloride and 500 cc. of water is heated, with occasional stirring, until a clear solution is obtained. The solution is allowed to stand overnight at 0° C. The potassium hydrogen tartrate which separates is removed by filtration and the filtrate is added slowly, with stirring, to a solution of 29.76 g. of potassium penicillin in 100 cc. of water. The solid which separates is isolated by filtration and is rapidly transferred to a vacuum desiccator where it is dried over phosphorus pentoxide. The solid so obtained is dissolved in 150 cc. of cold chloroform; the solution begins to crystallise almost immediately and is allowed to stand at 0° C. for 2 hours. The solid which has separated is isolated by filtration and dried in vacuo. There is thus obtained the penicillin G salt of α(N-phenyl-N-benzylamino) acetamidine in the form of a crystalline solid which contains chloroform of crystallisation. (Found C, 55.0; H, 5.1; N, 9.8; Cl, 15.9; $C_{31}H_{35}O_4N_5S$, $CHCl_3$ requires C, 55.4; H, 5.2; N, 10.1; Cl, 15.4.)

40 g. of the chloroform-containing product obtained in the above example is dissolved in 150 c. c. of boiling acetone and the solution is allowed to stand at 0° C. for 1 hour. The crystalline solid which separates is isolated by filtration and is dried in vacuo. There is thus obtained the penicillin G salt of N-phenyl-N-benzylaminoacetamidine in the form of a crystalline solid which contains acetone of crystallisation. (Found C, 63.75; H, 6.7; N, 11.1; $C_{31}H_{35}O_4N_5S$, $(CH_3)_2CO$ requires C, 64.6; H, 6.5; N, 11.1).

*Example 5*

In the preparation of the penicillin G salt of N-(2-dimethylaminopropyl)-phenothiazine, 1.1 g. of potassium penicillin G are dissolved in 5 cc. of distilled water. The pH of the solution is adjusted to 2.0 by the addition of 50% phosphoric acid solution and the acid solution is extracted with five successive portions of 5 cc. of ether. The combined ethereal extracts are dried over anhydrous magnesium sulphate at 0° C. for 1 hour. The magnesium sulphate is removed by filtration and the ethereal solution of penicillin G is treated, with stirring, with a solution of 0.81 g. of N-(2-dimethylaminopropyl)phenothiazine in 20 cc. of anhydrous ether. The solid which separates is isolated by filtration, washed with 10 c. c. of anhydrous ether and dried in vacuo over phosphorus pentoxide. The crude solid is purified by dissolving in 2 cc. of chloroform and treating the solution with 20 cc. of anhydrous ether. The solid which separates is isolated by filtration, washed with 10 cc. of ether, and dried in vacuo at 55° C. over phosphorus pentoxide. There is thus obtained the penicillin G salt of N-(2-dimethylaminopropyl)phenothiazine, in the form of a white solid. (Found N, 8.9; $C_{33}H_{38}O_4S_2$ requires N, 9.06.)

*Example 6*

In the preparation of the penicillin G salt of 2 - (N-p-methoxybenzyl - N - β - dimethylaminoethyl) -aminopyridine, 1.48 g. of potassium penicillin is dissolved in 7 c. c .of distilled water. The solution is adjusted to pH 2.0 by the addition of 50% phosphoric acid and is extracted with 5 portion of 10 cc. of ether. The ethereal extracts are combined and dried over anhydrous magnesium sulphate for 1 hour at 0° C. The magnesium sulphate is removed by filtration and the filtrate is added with stirring to a solution of 1.1 g. of 2-(N-p-methoxybenzyl-N-β-dimethylaminoethyl)-aminopyridine in 20 c. c. of anhydrous ether. The white solid which separates is isolated by filtration and is washed with 10 cc. of cold ether before being dried in vacuo over phosphorus pentoxide. The crude solid is dissolved in 3 cc. of chloroform, the solution is filtered, and the filtrate is treated with 30 cc. of anhydrous ether. The solid which separates is isolated by filtration, washed on the filter with 5 cc. of cold ether and dried in vacuo over phosphorus pentoxide at a temperature of 55° C. for 6 hours. There is thus obtained the penicillin G salt of 2-(N-p-methoxybenzyl-N-β-dimethylaminoethyl)-aminopyridine in the form of a white solid. (Found N, 11.2; $C_{33}H_{41}O_5N_5S$ requires N, 11.3.)

*Example 7*

In the preparation of the penicillin G salt of dl-1-(4'-chlorobenzhydryl) -4- methylpiperazine, 1.5 g. of potassium penicillin is dissolved in 7.5 cc. of distilled water. The solution is adjusted to pH 2.0 by the addition of 50% phosphoric acid and is extracted with 5 portions of 10 cc. of ether. The ethereal extracts are combined and dried over anhydrous magnesium sulphate for 1 hour at 0° C. The magnesium sulphate is removed by filtration and the filtrate is added, with stirring, to a solution of 1.2 g. of dl-1-(4'-chlorobenzhydryl)-4-methylpiperazine in 20 cc. of anhydrous ether. The solid which separates is isolated by filtration, washed on the filter with 10 cc. of cold ether and dried in vacuo over phosphorus pentoxide. The product is purified by dissolving in 3 cc. of chloroform, filtering the solution and treating the filtrate with 25 cc. of anhydrous ether. The solid which separates is isolated by filtration, washed on the filter with ether and dried in vacuo over phosphorus pentoxide at a temperature of 55° C. for 6 hours. There is thus obtained the penicillin G salt of dl-1-(4'-chlorobenzhydryl)-4-methylpiperazine in the form of a white solid. (Found N, 8.7; $C_{34}H_{39}O_4N_4S$ Cl requires N, 8.8.)

*Example 8*

In the preparation of an oily suspension of the penicillin G salt of α(N-phenyl-N-benzylamino) acetamidine suitable for therapeutic purposes, 2.4 g. of the penicillin G salt of α(N-phenyl-N-benzylamino) acetamidine (containing chloroform of crystallisation) which has been prepared as described in Example 4 but under sterile conditions, is suspended in 10 cc. of sterile arachis oil. There is thus obtained an oily suspension which contains 225,000 units/cc. of penicillin activity. An oily suspension of the penicillin G salt of α(N-phenyl-N-benzylamino) acetamidine (containing chloroform of crystallisation) which also contains 2% of aluminium monostearate may be prepared under similar conditions.

Similar compounds may be obtained by using other penicillins, for example penicillin X or penicillin K, in place of penicillin G, in the preceding examples.

We claim:

1. A solid penicillin salt of an antihistamine base selected from the group consisting of α-(N-phenyl-N-benzylamino) acetamidine and 2(N-phenyl-N-benzylaminomethyl) 4:5 dihydroglyoxaline.

2. A solid penicillin salt of α(N-phenyl-N-benzylamino) acetamidine.

3. A solid penicillin G salt of α(N-phenyl-N-benzylamino) acetamidine.

4. A solid penicillin salt of 2(N-phenyl-N-benzylaminomethyl)-4:5-dihydroglyoxaline.

5. A solid penicillin G salt of 2(N-phenyl-N-benzylaminomethyl)-4:5-dihydroglyoxaline.

References Cited in the file of this patent

UNITED STATES PATENTS

| Number | Name | Date |
|---|---|---|
| 2,493,625 | Goldberg et al. | Jan. 3, 1950 |
| 2,515,898 | Rhodehamel | July 18, 1950 |
| 2,533,066 | Taplin et al. | Dec. 5, 1950 |
| 2,558,014 | Stiller | June 26, 1951 |
| 2,579,185 | Granatek | Dec. 18, 1951 |
| 2,585,239 | Granatek | Feb. 12, 1952 |

OTHER REFERENCES

Monash, "Science," vol. 106, October 17, 1947, p. 370.

Simon "Ann. Allergy" March-April 1950, vol. 8, pp. 194 and 196 (presented at meeting of the American College of Allergists, January 15–18, 1950, St. Louis, Missouri).